United States Patent
Nitsche et al.

(10) Patent No.: US 11,066,906 B2
(45) Date of Patent: Jul. 20, 2021

(54) SUBMERSIBLE VEHICLE WITH OPTICAL FIBER

(71) Applicant: HALLIBURTON ENERGY SERVICES, INC., Houston, TX (US)

(72) Inventors: Wolfgang Hartmut Nitsche, Humble, TX (US); John Laureto Maida, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/640,334

(22) PCT Filed: Oct. 26, 2017

(86) PCT No.: PCT/US2017/058552
§ 371 (c)(1),
(2) Date: Feb. 19, 2020

(87) PCT Pub. No.: WO2019/083536
PCT Pub. Date: May 2, 2019

(65) Prior Publication Data
US 2020/0355048 A1    Nov. 12, 2020

(51) Int. Cl.
*E21B 41/04* (2006.01)
*E21B 47/001* (2012.01)
*G02B 6/44* (2006.01)

(52) U.S. Cl.
CPC ............ *E21B 41/04* (2013.01); *G02B 6/4458* (2013.01)

(58) Field of Classification Search
CPC ........ E21B 41/04; E21B 47/00; E21B 47/001; E21B 47/002; G02B 6/4458
See application file for complete search history.

(56) References Cited

U.S. PATENT DOCUMENTS

| | | |
|---|---|---|
| 5,142,990 A | 9/1992 | Leonard |
| 5,419,512 A * | 5/1995 | Holzschuh ................ F41G 7/32 244/3.12 |
| 5,637,825 A | 6/1997 | Glenning |
| 6,167,831 B1 | 1/2001 | Watt et al. |
| 6,411,565 B1 | 6/2002 | Sirmalis et al. |
| 6,561,488 B1 * | 5/2003 | Walker .................. E21B 47/135 254/134.4 |

(Continued)

FOREIGN PATENT DOCUMENTS

| | | | |
|---|---|---|---|
| DE | 4414737 C1 | 1/1996 | |
| EP | 0450814 A1 | 9/1991 | |
| WO | WO-8606165 A1 * | 10/1986 | ........... G01N 29/265 |

OTHER PUBLICATIONS

International Search Report and Written Opinion; PCT Application No. PCT/US2017/058552; dated Jul. 4, 2018.

(Continued)

*Primary Examiner* — Matthew R Buck
(74) *Attorney, Agent, or Firm* — Polsinelli PC

(57) ABSTRACT

A submersible vehicle is provided which includes a housing, an optical fiber coupled with the housing and communicatively coupled with a data acquisition system, and a propulsion system. The propulsion system is configured to propel the submersible vehicle in a fluid at a velocity. The optical fiber is configured to be released at a release rate equal to or greater than the velocity of the submersible vehicle.

18 Claims, 3 Drawing Sheets

(56) References Cited

U.S. PATENT DOCUMENTS

| | | |
|---|---|---|
| 8,496,858 B2 | 7/2013 | Brenner et al. |
| 8,831,393 B2 | 9/2014 | Jung |
| 2005/0161231 A1 | 7/2005 | Prendin et al. |
| 2011/0079401 A1* | 4/2011 | Gambier ............... E21B 23/14 |
| | | 166/384 |
| 2011/0094741 A1* | 4/2011 | Vigneaux ............ G01B 11/026 |
| | | 166/282 |
| 2011/0139447 A1 | 6/2011 | Ramos et al. |
| 2014/0376332 A1 | 12/2014 | Vigneaux et al. |
| 2015/0316196 A1 | 11/2015 | Farque et al. |
| 2019/0010803 A1* | 1/2019 | Purkis .................... E21B 17/20 |

OTHER PUBLICATIONS

English abstract of DE4414737; retrieved from https://patents.google.com/patent/DE4414737C1/en on Oct. 14, 2017.
DM2A4; retrived from https://en.wikipedia.org/wiki/DM244 on Feb. 19, 2020.
Black Shark Torpedo; https://en.wikipedia.org/wiki/Black_Shark_Torpedo on Feb. 19, 2020.
Pump Jet; https://en.wikipedia.org/wiki/Pump-jet on Feb. 19, 2020.

* cited by examiner

SUBMERSIBLE VEHICLE WITH OPTICAL FIBER

CROSS-REFERENCE TO RELATED APPLICATIONS

This application is a national stage entry of PCT/US2017/058552 filed Oct. 26, 2017, said application is expressly incorporated herein in its entirety.

FIELD

The present disclosure relates generally to submersible vehicles. In particular, the present disclosure relates to submersible vehicles configured to propel through fluid and release an optical fiber within a fluidic channel.

BACKGROUND

Wellbores are drilled into the earth for a variety of purposes including tapping into hydrocarbon bearing formations to extract the hydrocarbons for use as fuel, lubricants, chemical production, and other purposes. Fluidic channels such as wellbores or pipelines need to be inspected to determine issues such as leaks, blockages, or structural erosion or damage.

Pipeline inspection gadgets (PIGs) may be used in pipelines for applications such as, for example, hydrostatic testing, pipeline cleanup, batch transportation, or inspection. PIGs are pushed through the pipeline by the fluid flowing through the pipeline. Also, PIGs store the measured data on an internal storage within the PIG. As such, the measured data from a PIG is accessible when the PIG has been retrieved from the pipeline.

BRIEF DESCRIPTION OF THE DRAWINGS

Implementations of the present technology will now be described, by way of example only, with reference to the attached figures, wherein.

DETAILED DESCRIPTION

Figure 1:
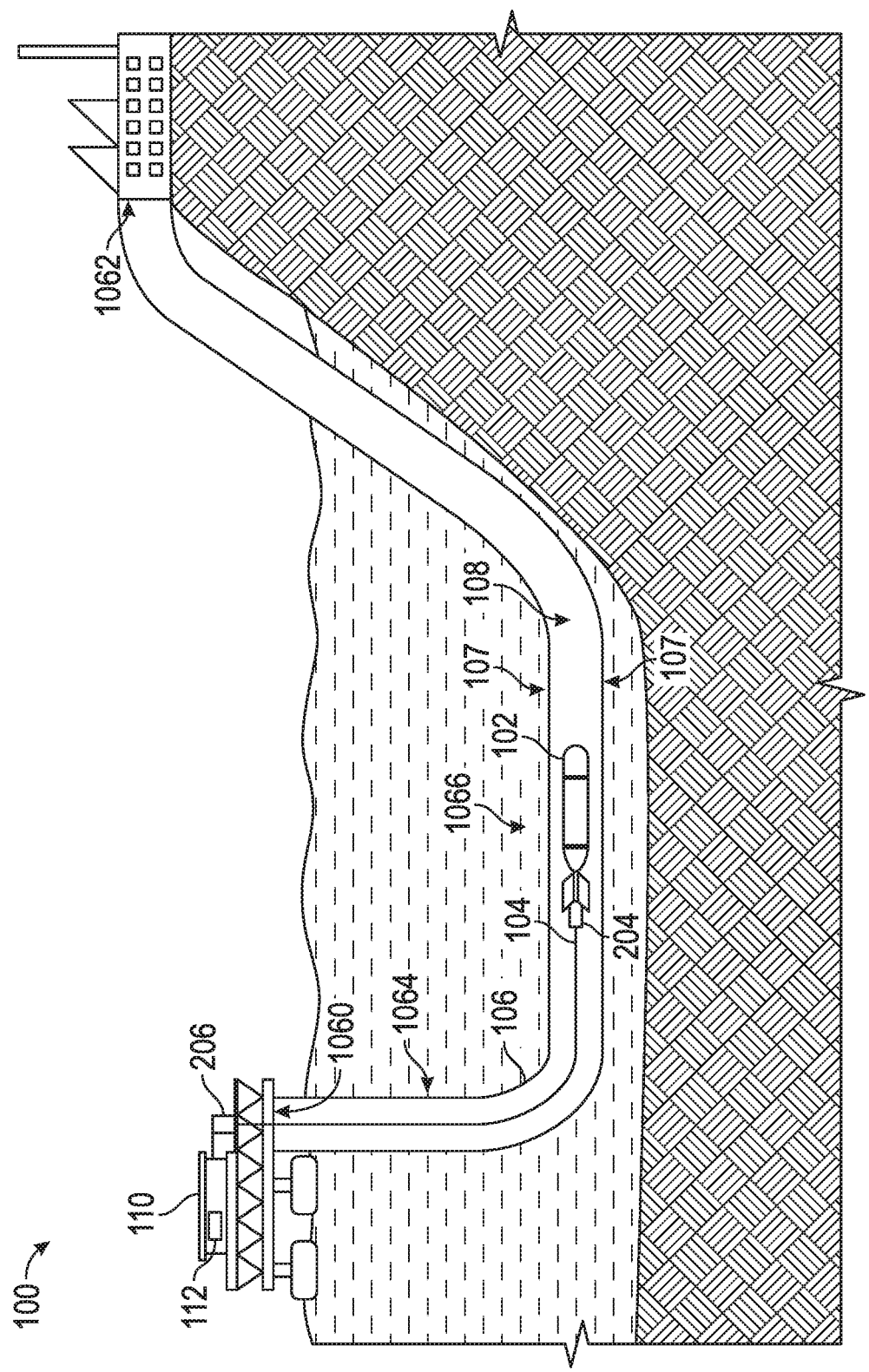
FIG. 1 is a diagram illustrating an exemplary environment for a submersible vehicle according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

In the above description, reference to up or down is made for purposes of description with "up," "upper," "upward," "uphole," or "upstream" meaning toward the surface of the wellbore or the first (or proximal) end of the fluidic channel, and with "down," "lower," "downward," "downhole," or "downstream" meaning toward the terminal end of the well, regardless of the wellbore orientation, or toward the second (or distal) end of the fluidic channel. Correspondingly, the transverse, axial, lateral, longitudinal, radial, etc., orientations shall mean orientations relative to the orientation of the wellbore or device. The term "axially" means substantially along a direction of the axis of the object. If not specified, the term axially is such that it refers to the longer axis of the object.

Several definitions that apply throughout the above disclosure will now be presented. The term "coupled" is defined as connected, whether directly or indirectly through intervening components, and is not necessarily limited to physical connections. The connection can be such that the objects are permanently connected or releasably connected. The term "outside" or "outer" refers to a region that is beyond the outermost confines of a physical object. The term "inside" or "inner" refers to a region that is within the outermost confines of a physical object. The term "substantially" is defined to be essentially conforming to the particular dimension, shape or other word that substantially modifies, such that the component need not be exact. For example, "substantially cylindrical" means that the object resembles a cylinder, but can have one or more deviations from a true cylinder. The terms "comprising," "including" and "having" are used interchangeably in this disclosure. The terms "comprising," "including" and "having" mean to include, but not necessarily be limited to the things so described. The term "real-time" or "real time" means substantially instantaneously. The term "proximate" means close to, nearby, or closer to than others. For example, "proximate the first end" means closer to the first end than to the second end.

Disclosed herein is a submersible vehicle to be used in a fluidic channel. A fluidic channel can be, for example, a wellbore, a pipeline, or any channel with a fluid inside of the channel with a first end and a second end. The first end of the fluidic channel is open such that the submersible vehicle can be deployed into the fluidic channel through the first end. The submersible vehicle has a propulsion system such that the submersible vehicle can be propelled in the fluid regardless of the flow of the fluid. For example, if there is a blockage in the fluidic channel such that no fluid can flow, the submersible vehicle can still propel itself through the fluidic channel. The submersible vehicle can propel itself through the fluidic channel at a rate faster, slower, or against the flow of the fluid within the fluidic channel. As such, the submersible vehicle is not dependent on the flow of the fluid to be transported through the fluidic channel.

As the submersible vehicle is propelled in the fluidic channel from the first end to the second end, an optical fiber is released to the extent necessary to avoid breaking the optical fiber as a result of the movement of the submersible vehicle and/or the flow of the fluid. For example, the optical fiber can be released substantially continuously and/or can be released intermittently. The optical fiber may be released at a rate (such as in terms of length/time) equal to or greater than the magnitude of velocity of the submersible vehicle; also, the optical fiber may be released such that the optical fiber is at rest relative to the fluid.

The optical fiber is connected to a data acquisition system, which may be proximate to the first end of the fluidic channel. The data acquisition system may be statically positioned at a control point, such that it can be accessed directly or remotely by a human or electronic operator.

The optical fiber can be used to transmit, in real-time, measured parameters to the data acquisition system. The submersible vehicle may have sensors such that the measured data is transmitted through the optical fiber. Additionally, the optical fiber may, itself, be a sensor. For example, the optical fiber may be used as a distributed temperature sensor, a distributed acoustic sensor, a distributed pressure sensor, a chemical sensor, a camera, or an x-ray sensor. With the measured parameters, an operator can easily inspect the fluidic channel. For example, in inspecting a pipeline, the pipeline may be closed on both ends and pressurized. The optical fiber can then determine leaks in the pipeline based on acoustic data, such as fizzing sounds. In other examples, the optical fiber may act as a camera and pass along visuals to the data acquisition system. The operator may then have visuals in real-time on the fluidic channel, such as to see blockages in the fluidic channel.

The submersible vehicle can be employed in an exemplary system 100 shown, for example, in FIG. 1. FIG. 1 illustrates a submersible vehicle 102 deployed in a fluidic channel 106. The fluidic channel 106 has a first end 1060 and a second end 1062. The fluidic channel 106 illustrated in FIG. 1 is a pipeline. Each of the first end 1060 and the second end 1062 are open such that the first and second ends 1060, 1062 are accessible by an operator and fluid can flow through the open ends. In other examples, the second end 1062 of the fluidic channel 106 is closed such that fluid cannot flow through the second end 1062. As such, the fluidic channel 106 can be, for example, a pipeline, a wellbore, a drill string, or any channel through which fluid flows. In at least one example, the first and second ends 1060, 1062 can be located along any point of the fluidic channel 106. For example, the first end 1060 may be located in the middle of the fluidic channel 106. The first end 1060 is any entry point to gain access to the fluidic channel 106. As illustrated in FIG. 1, the fluidic channel 106 has a vertical section 1064 and a horizontal section 1066. In other examples, the fluidic channel 106 can extend only in one direction or multiple directions along any axis.

The fluidic channel 106 includes a fluid 108 which is contained within the walls 107 of the fluidic channel 106. The fluid 108 can be one fluid or more than one fluid. The fluid 108 can include, for example, water or oil. The fluid 108 can also substantially fill the entire fluidic channel 106. In other examples, the fluid 108 can partially fill the fluidic channel 106.

Figure 2:
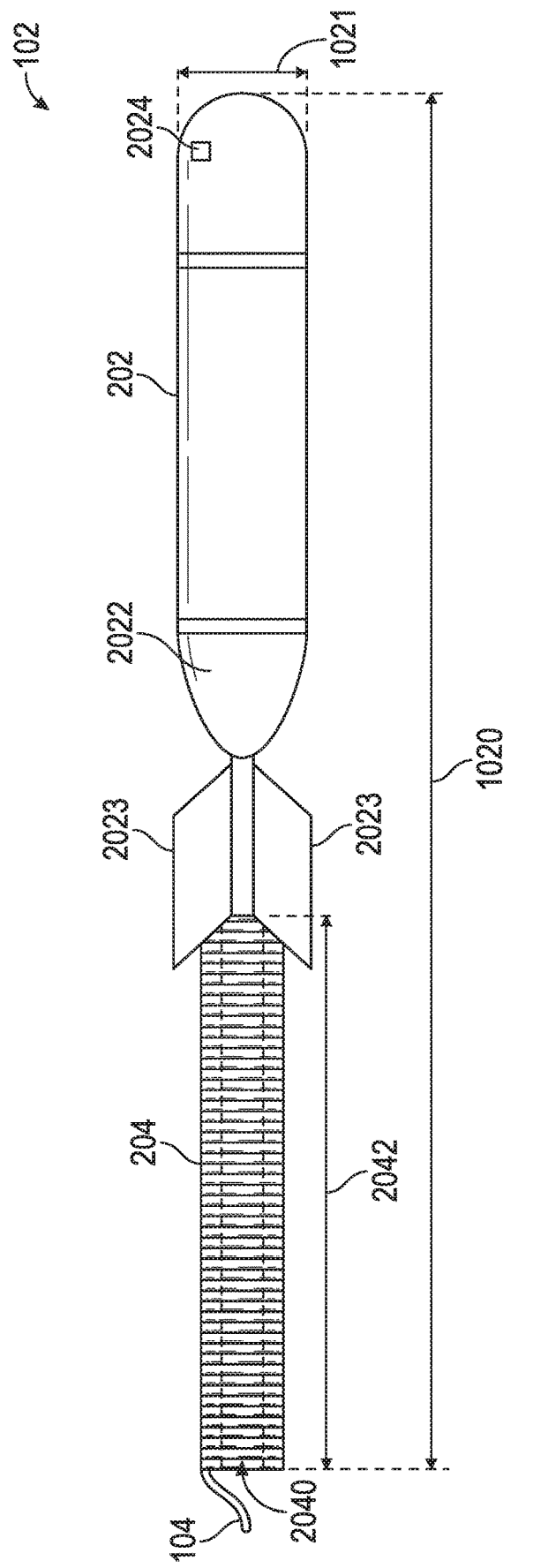
FIG. 2 is a diagram illustrating a submersible vehicle according to the present disclosure.

Referring also to FIG. 2, the submersible vehicle 102 includes a housing 202. The housing 202 of the submersible vehicle 102 can be any material that can withstand the pressures and corrosive properties of the fluidic channel 106. The housing 202 of the submersible vehicle 102 can be inexpensive and degradable such that the submersible vehicle 102 does not have to be retrieved. The housing 202 of the submersible vehicle 102 can include, for example, a metal or a plastic such as acetal resin, polyether ether ketone, aluminum, polyimide, and engineered thermoplastics. In other examples, the housing 202 of the submersible vehicle 102 can be a resilient material, such as steel, such that the submersible vehicle 102 can be retrieved and re-used multiple times. The submersible vehicle 102 may be buoyant such that the submersible vehicle 102 does not sink and drag along the bottom of the fluidic channel 106.

The submersible vehicle 102 is configured to be propelled at a velocity within the fluidic channel 106 independent of the flow rate of the fluid 108. The velocity of the submersible vehicle 102 is in relation to the fluidic channel 106. As such, the flow rate of the fluid 108 is not considered when determining the velocity of the submersible vehicle 102. The submersible vehicle 102 is propelled by a propulsion system 2022 toward the second end 1062 of the fluidic channel 106. The propulsion system 2022 can be any suitable system to cause the submersible vehicle 102 to move within a fluid 106, independent of the flow rate of the fluid 106. For example, the propulsion system 2022 can be one or more propellers, a pump-jet system where the moving parts are inside of the submersible vehicle 102, or any suitable propulsion system 2022 to propel the submersible vehicle 102 within a fluid 106. To power the propulsion system 2022, the submersible vehicle 102 may include a power source such as lithium batteries or slow-burning chemical charges. In other examples, any suitable power source can be utilized such that the propulsion system 2022 receives adequate power to propel the submersible vehicle 102 from the first end 1060 to the second end 1062 of the fluidic channel 106. Slow-burning chemical charges can also be utilized as a propulsion system 2022 to release a jet of hot gas or steam for rocket-like propulsion. In at least one example, the submersible vehicle 102 can be propelled at a velocity greater than the flow of the fluid 108. In other examples, if the fluid 108 is not moving, due to circumstances such as blockages or that the fluidic channel 106 is not being utilized, the submersible vehicle 102 can be propelled such that the submersible vehicle 102 traverses through the fluidic channel 106. The submersible vehicle 102 may include fins 2023, which can assist in controlling the direction, orientation, and/or stability of the submersible vehicle 102. The fins 2023 can be adjustable. When the fins 2023 are adjustable, the fins 2023 are powered by a motor. The motor can be operable to move the fins 2023. The motor may be connected to a processor which provides instructions to the motor to move the fins 2023 as desired. In other examples, the fins 2023 are not adjustable.

The submersible vehicle 102 may include electronics 2024. Electronics 2024 may include sensors which can detect and measure parameters of the fluidic channel 106. For example, the sensors may be cameras, temperature sensors, pressure sensors, acoustic sensors, or x-ray sensors. Electronics 2024 may also include memory storage. The memory storage may store the measured parameters. In at least one example, the submersible vehicle 102 does not include electronics 2024.

The submersible vehicle 102 includes a vehicle bobbin 204. The vehicle bobbin 204 provides an optical fiber 104. The optical fiber 104 is coupled with the vehicle bobbin 204. For example, the optical fiber 104 can be wound within the vehicle bobbin 204. In other examples, the optical fiber 104 can be wound around the vehicle bobbin 204. In yet other examples, the optical fiber 104 can be wound such that the optical fiber 104 is substantially folded so that a section of the optical fiber 104 can be released at a time. In yet other examples, the optical fiber 104 can be wound such that the optical fiber 104 overlaps itself and forms a ball-like structure which can be substantially spherical, ovoid, or any other suitable shape. The method of providing the optical fiber 104 can vary so long as the optical fiber 104 is not damaged and is releasable from the vehicle bobbin 204 in a controlled manner and without damaging the optical fiber 104. The vehicle bottom 204 is coupled with the housing 202. The vehicle bobbin 204 can be contained within the housing 202. In other examples, the vehicle bobbin 204 can be located behind the housing 202. The position of the vehicle bobbin 204 can vary, so long as the optical fiber 104 being released from the vehicle bobbin 204 is not damaged by propulsion of the submersible vehicle 102. For example, the vehicle bobbin 204 can be a hollow cylindrical shape. The propulsion of the submersible vehicle 102 may be released through the hollow portion of the vehicle bobbin 204. In other examples, the vehicle bobbin 204 can be a circular, rectangular, triangular, egg-shaped, or any other suitable shape to contain and release the optical fiber 104. Also, to avoid damaging the optical fiber 104, the propulsion system 2022 may be positioned at the front of the body 202. As such, the propulsion system 2022, for example a propeller, cannot become entangled with the optical fiber 104 being released from the rear of the submersible vehicle 102. In other examples, if the propulsion system 2022 is, for example, a pump-jet system, where the propulsion system 2022 is contained within the body 202 of the submersible vehicle 102, the propulsion system 2022 may not damage the optical fiber 104 being released from the rear of the submersible vehicle 102. The vehicle bobbin 204 can be made of any suitable material, such as plastics, metals, or a combination thereof.

The optical fiber 104 is released from the vehicle bobbin 204 at a release rate equal to or greater than the velocity of the submersible vehicle 102. Also, the movement of the fluid 108 affects the release rate of the optical fiber 104. For example, if the fluid 108 is flowing in a direction opposite to the direction of the submersible vehicle 102, then the optical fiber 104 is released at a rate greater than the velocity of the submersible vehicle 102. As such, the optical fiber 104 is at rest relative to the fluid 108 such that the optical fiber 104 does not experience stress which may break the optical fiber 104.

The optical fiber 104 can be released from the vehicle bobbin 204 such that the optical fiber 104 releases as the submersible vehicle 102 moves and/or as the fluid 108 flows. For example, the vehicle bobbin 204 may freely rotate such that as the submersible vehicle 102 moves and/or as the fluid 108 flows, the vehicle bobbin 204 rotates in response to the line tension caused by the releasing optical fiber 104. The optical fiber 104 can also be released from the vehicle bobbin 204 by a controller which controls the vehicle bobbin 204 such that the vehicle bobbin 204 rotates by a motor and/or braking system to release the optical fiber 104 in a controlled manner.

Additionally, the optical fiber 104 may also be partially provided by a second bobbin 206, similar to or by any suitable ways as described above with the vehicle bobbin 204. The second bobbin 206 can be positioned at the first end 1060 of the fluidic channel 106. As such, one end of the optical fiber 104 may be coupled with the vehicle bobbin 204 while an opposite end of the optical fiber 104 may be coupled with the second bobbin 206. Similar to the vehicle bobbin 204, the second bobbin 206 is configured to release the optical fiber 104 at a second release rate such that the optical fiber 104 is at rest relative to the fluid 108. In at least one example, the system 100 may not include a second bobbin 206.

In both the vehicle bobbin 204 and the second bobbin 206, the optical fiber 104 may be wound to no smaller than a diameter where the optical fiber 104 becomes pinched. If the optical fiber 104 becomes pinched, the optical fiber 104 may break. As such, if a longer length of optical fiber 104 is used, the length and/or the diameter of the vehicle bobbin 204 and/or the second bobbin 206 may be increased.

The vehicle bobbin 204 and the second bobbin 206 may work together to release the optical fiber 104 in the most efficient manner to prevent breakage of the optical fiber 104. For example, as illustrated in FIG. 1, the submersible vehicle 102 initially moves vertically downward in vertical section 1064. While moving vertically downward, the submersible vehicle 102 may propel itself. The submersible vehicle 102 also may not propel itself, relying on gravity to pull the submersible vehicle 102 through the fluidic channel 106. During that time, the second bobbin 206 may release the optical fiber 104 while the vehicle bobbin 204 may only periodically, slowly, or may not release the optical fiber 104. When the submersible vehicle 102 begins propelling itself through the fluidic channel 106 in another direction such as the horizontal section 1066 illustrated in FIG. 1, to decrease stress and tension on the optical fiber 104, the vehicle bobbin 204 may begin releasing the optical fiber 104.

Referring again to FIG. 2, to avoid damage to the optical fiber 104, the length 1020 of the submersible vehicle 102 may be greater than the inside diameter of the fluidic channel 106. Additionally, the length 1020 of the submersible vehicle 102 is greater than the width 1021 of the submersible vehicle 102. As such, the submersible vehicle 102 may not rotate upon itself, which can entangle or damage the optical fiber 104.

The optical fiber 104 is communicatively coupled with a data acquisition system 112. The optical fiber 104 is configured to transmit measured parameters in real-time to the data acquisition system 112. The data acquisition system 112 receives and processes data such that the data can be used and interpreted by a user. The data acquisition system 112 is located in a data center 110, which can be proximate to the first end 1060 of the fluidic channel 106. The data center 110 may be above ground, under water, underground, or located at any point to collect data. For example, the data center 110 may be an underwater vehicle such as a submarine. In other examples, the data center 110 may be located on a platform, as illustrated in FIG. 1.

The optical fiber 104 can function as a sensor which provides measured parameters in real-time to the data acquisition system 112. The optical fiber 104 is inexpensive, lightweight, and can transmit data at a higher bandwidth than traditional wire cables without the need for electrical power. The optical fiber 104 can be configured to be, for example, a distributed temperature sensor, a distributed acoustic sensor, a distributed pressure sensor, a chemical sensor, a camera, and an x-ray sensor. To obtain measurements, laser generated light pulses can be sent at timed intervals. The light returned is then analyzed by the data acquisition system 112 and information, such as temperature and pressure vs. position on the optical fiber 104 can be determined. In other examples, to obtain measurements, an array of Fiber Bragg grating is implemented in the optical fiber 104. With Fiber Bragg grating, a continuous light source is used, and the measurement is based on wavelength interrogation by the data acquisition system 112.

Additionally, if the submersible vehicle 102 includes electronics 2024, the measured parameters may be transmitted through the optical fiber 104 from the electronics 2024 in the submersible vehicle 102.

As such, the optical fiber 104 can be used as a sensor or used as a communication link which can provide measured parameters in real-time to the data acquisition system 112 to be processed and analyzed by a user.

When the submersible vehicle 102 reaches the second end 1062 of the fluidic channel 106, the submersible vehicle 102 may be retrieved. For example, if the second end 1062 of the fluidic channel 106 is open, then the submersible vehicle 102 may be manually retrieved. The submersible vehicle 102 may also be retrieved at the second end 1062 with a mesh or net where the fluid 108 flows through the net while the submersible vehicle 102 is captured. In other examples, if the second end 1062 is closed, such as in a wellbore, then the submersible vehicle 102 may be deposited in the second end 1062, for example in a rat hole at the bottom of the wellbore, to be retrieved at a later time. Alternatively, the submersible vehicle 102 may be left in the closed second end 1062 to degrade and is not retrieved.

The optical fiber 104 may be released or separated from the data acquisition system 112. For example, when the submersible vehicle 102 reaches the second end 1062 of the fluidic channel 106, then the optical fiber 104 may be released such that the movement of the fluid 108 may carry the optical fiber 104 to the second end 1062 for retrieval. In other examples, the optical fiber 104 may stay in the fluidic channel 106, temporarily or permanently, to continuously measure parameters, such as distributed acoustic sensing measurements.

Figure 3:
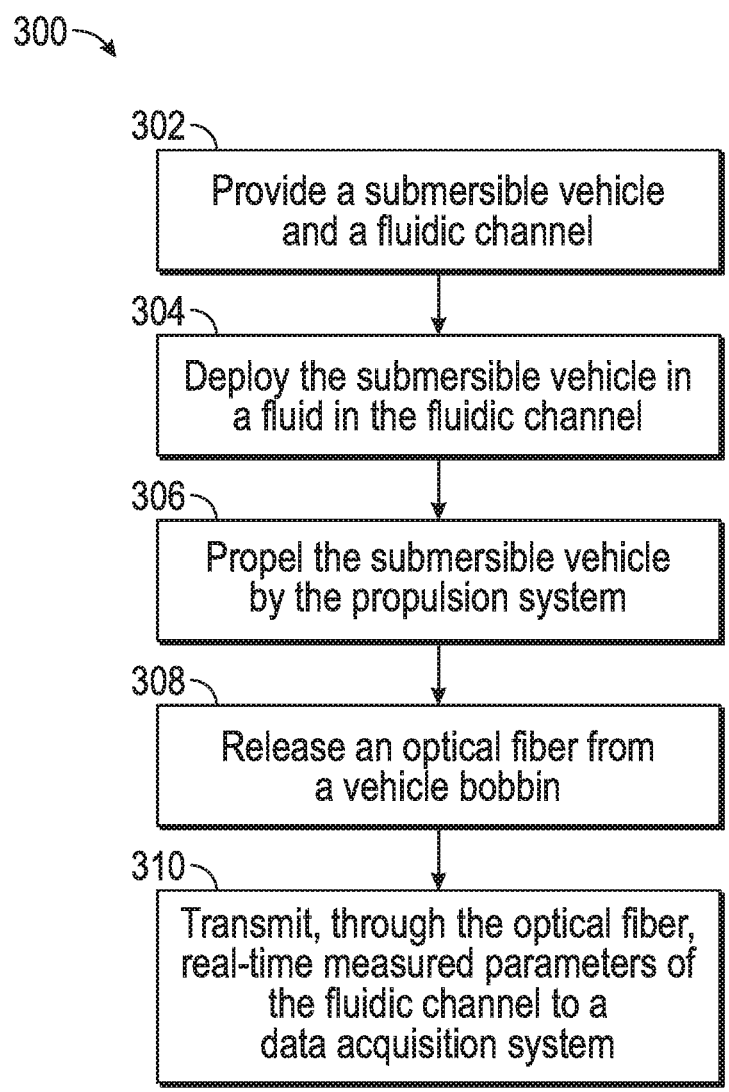
FIG. 3 is a flow chart of a method for utilizing an exemplary submersible vehicle.

Referring to FIG. 3, a flowchart is presented in accordance with an example embodiment. The method 300 is provided by way of example, as there are a variety of ways to carry out the method. The method 300 described below can be carried out using the configurations illustrated in FIGS. 1-2, for example, and various elements of these figures are referenced in explaining example method 300. Each block shown in FIG. 3 represents one or more processes, methods or subroutines, carried out in the example method 300. Furthermore, the illustrated order of blocks is illustrative only and the order of the blocks can change according to the present disclosure. Additional blocks may be added or fewer blocks may be utilized, without departing from this disclosure. The example method 300 can begin at block 302.

At block 302, a submersible vehicle and a fluidic channel are provided. The fluidic channel is at least partially filled with a fluid, such as water or oil. The fluidic channel may be under ground, above ground, or under water. The fluidic channel has a first end and a second end. The first and second ends may be at any two points along the fluidic channel. The first end is open to receive the submersible vehicle. The second end may be open such that the fluid and/or the submersible vehicle may pass through and be retrieved through the second end, such as, for example, a pipeline. The second end may be closed such that the fluid and/or the submersible vehicle cannot pass through the second end, such as, for example, a wellbore. The submersible vehicle includes a housing. The housing may be durable such that the submersible vehicle can be retrieved. In other examples, the housing may be inexpensive and/or degradable such that the submersible vehicle does not have to be retrieved. For example, the housing may be made of acetal resin, polyether ether ketone, aluminum, polyimide, and engineered thermoplastics. The submersible vehicle also includes a propulsion system which is configured to propel the submersible vehicle independent of the flow rate of the fluid. The submersible vehicle includes a vehicle bobbin which provides an optical fiber. A second bobbin proximate to the first end may also be provided which provides an opposite end of the optical fiber.

At block 304, the submersible vehicle is deployed in the fluid in the fluidic channel. The submersible vehicle can be deployed in the fluidic channel through the first end of the fluidic channel.

At block 306, the submersible vehicle is propelled by the propulsion system. The propulsion system can be, for example, a propeller or a pump-jet system. To power the propulsion system, the submersible vehicle can include a power source such as lithium batteries or slow-burning chemical charges. In at least one example, the chemical charges may function as the propulsion system by releasing a jet of hot gas or steam for rocket-like propulsion. The propulsion system can propel the submersible vehicle independent of the flow rate of the fluid. For example, if the fluid is not flowing, then the propulsion system can still propel the submersible vehicle towards the second end of the fluidic channel. Even if the fluid is flowing the opposite direction, the submersible vehicle can be propelled toward the second end of the fluidic channel.

While the submersible vehicle is moving toward the second end of the fluidic channel, at block 308, the optical fiber is being released from the vehicle bobbin and/or the second bobbin. The optical fiber is released at a release rate equal to or greater than the velocity of the submersible vehicle. Also, the optical fiber is released such that the optical fiber is at rest relative to the fluid in the fluidic channel. As such, the release of the optical fiber is adjusted based on the velocity of the vehicle as well as the movement of the fluid.

The optical fiber can be used to measure parameters of the fluidic channel in real-time. For example, the optical fiber can be configured to be at least one of a distributed temperature sensor, a distributed acoustic sensor, a distributed pressure sensor, a chemical sensor, a camera, and/or an x-ray sensor. As such, the measured parameters of the fluidic channel can be, for example, temperature, acoustics, pressure, chemical composition, visuals, and x-ray. In at least one example, the submersible vehicle can include electronics. The electronics in the submersible vehicle can include sensors to measure the parameters.

At block 310, the real-time measured parameters of the fluidic channel are transmitted, through the optical fiber, to a data acquisition system. The measured parameters may also be provided, or transmitted, in real-time through the optical fiber, as the optical fiber is itself the sensor. The measured parameters may also be transmitted in real-time through the optical fiber from the electronics, such as the sensors, in the submersible vehicle. The data acquisition system receives and processes data such that the data can be used and interpreted by a user. The data acquisition system may be positioned proximate to the first end of the fluidic channel. Additionally, the electronics in the submersible vehicle can also include memory storage. The memory storage can store the data of the measured parameters. The memory storage can then be accessed when the submersible vehicle is retrieved.

Numerous examples are provided herein to enhance understanding of the present disclosure. A specific set of statements are provided as follows.

Statement 1: A submersible vehicle comprising: a housing; an optical fiber coupled with the housing and communicatively coupled with a data acquisition system; and a propulsion system coupled with the housing, the propulsion system configured to propel the submersible vehicle in a fluid at a velocity; wherein the optical fiber is configured to be released at a release rate equal to or greater than the velocity of the submersible vehicle.

Statement 2: A submersible vehicle is disclosed according to Statement 1, wherein the optical fiber is at rest relative to the fluid.

Statement 3: A submersible vehicle is disclosed according to Statements 1 or 2, further comprising a bobbin coupled with the housing, wherein the optical fiber is provided by the bobbin and is configured to be released from the bobbin.

Statement 4: A submersible vehicle is disclosed according to any of preceding Statements 1-3, wherein the propulsion system comprises at least one of a propeller and a pump-jet system.

Statement 5: A submersible vehicle is disclosed according to any of preceding Statements 1-4, wherein the optical fiber is configured to transmit, in real-time, measured parameters to the data acquisition system.

Statement 6: A submersible vehicle is disclosed according to Statement 5, wherein the measured parameters include at least one of temperature, acoustics, pressure, chemical composition, visuals, and x-ray.

Statement 7: A submersible vehicle is disclosed according to Statements 5 or 6, wherein the optical fiber is configured to be at least one of a distributed temperature sensor, a distributed acoustic sensor, a distributed pressure sensor, a chemical sensor, a camera, and an x-ray sensor.

Statement 8: A submersible vehicle is disclosed according to any of preceding Statements 1-7, wherein the housing is made from at least one of acetal resin, polyether ether ketone, aluminum, polyimide, and engineered thermoplastics.

Statement 9: A submersible vehicle is disclosed according to any of preceding Statements 1-8, further comprising sensors positioned in the housing, the sensors configured to measure parameters, wherein the measured parameters are transmitted through the optical fiber to the data acquisition system.

Statement 10: A system comprising: a fluidic channel having a first end and a second end, the fluidic channel comprising a fluid; a submersible vehicle disposed within the fluidic channel, the submersible vehicle comprising: a housing; an optical fiber coupled with the housing and communicatively coupled with a data acquisition system; and a propulsion system coupled with the housing, the propulsion system configured to propel the submersible vehicle in a fluid at a velocity; wherein the optical fiber is configured to be released at a release rate, the release rate being equal to or greater than the velocity of the submersible vehicle.

Statement 11: A system is disclosed according to Statement 10, wherein the optical fiber is at rest relative to the fluid.

Statement 12: A system is disclosed according to Statements 10 or 11, wherein the optical fiber is configured to transmit, in real-time, measured parameters of the fluidic channel to the data acquisition system.

Statement 13: A system is disclosed according to Statement 12, wherein the measured parameters include at least one of temperature, acoustics, pressure, chemical composition, visuals, and x-ray.

Statement 14: A system is disclosed according to Statements 12 or 13, wherein the optical fiber is configured to be at least one of a distributed temperature sensor, a chemical sensor, a camera, and an x-ray sensor.

Statement 15: A system is disclosed according to any of preceding Statements 10-14, wherein the submersible vehicle further comprises sensors, the sensors configured to measure parameters of the fluidic channel, wherein the measured parameters are transmitted through the optical fiber to the data acquisition system.

Statement 16: A system is disclosed according to Statement 15, wherein the submersible vehicle further comprises a memory storage, wherein the measured parameters are stored in the memory storage.

Statement 17: A system is disclosed according to any of preceding Statements 10-16, wherein the fluidic channel is one of a wellbore, a drill string, or a pipeline.

Statement 18: A system is disclosed according to any of preceding Statements 10-17, wherein the submersible vehicle further comprises a bobbin coupled with the housing, wherein the optical fiber is provided by the bobbin and is configured to be released from the bobbin Statement 19: A system is disclosed according to Statement 18, further comprising a second bobbin positioned proximate the first end of the fluidic channel, wherein one end of the optical fiber is contained in the vehicle bobbin while an opposite end of the optical fiber is contained in the second bobbin, the second bobbin is configured to release the optical fiber at a second release rate such that the optical fiber is at rest relative to the fluid.

Statement 20: A method comprising: providing a submersible vehicle and a fluidic channel having a first end and a second end, the submersible vehicle comprising: a housing; an optical fiber coupled with the housing and communicatively coupled with a data acquisition system; and a propulsion system coupled with the housing, the propulsion system configured to propel the submersible vehicle; wherein the data acquisition system is proximate the first end of the fluidic channel; deploying the submersible vehicle in a fluid in the fluidic channel through the first end of the fluidic channel; propelling, by the propulsion system, the submersible vehicle from the first end toward the second end of the fluidic channel at a velocity; releasing the optical fiber at a release rate equal to or greater than the velocity of the submersible vehicle; and transmitting, in real-time through the optical fiber, measured parameters of the fluidic channel to the data acquisition system.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A submersible vehicle comprising:
   a housing;
   an optical fiber coupled with the housing and communicatively coupled with a data acquisition system; and
   a propulsion system coupled with the housing, the propulsion system configured to propel the submersible vehicle in a fluid at a velocity, wherein the propulsion system includes at least one of propellers or a pump-jet system;
   wherein the optical fiber is configured to be released at a release rate equal to or greater than the velocity of the submersible vehicle,
   wherein the optical fiber is configured to transmit, in real-time, measured parameters to the data acquisition system, and
   wherein the submersible vehicle is buoyant so as to not sink or contact objects to be inspected.

2. The submersible vehicle of claim 1, wherein the optical fiber is at rest relative to the fluid.

3. The submersible vehicle of claim 1, further comprising a bobbin coupled with the housing, wherein the optical fiber is provided by the bobbin and is configured to be released from the bobbin.

4. The submersible vehicle of claim 1, wherein the measured parameters include at least one of temperature, acoustics, pressure, chemical composition, visuals, and x-ray.

5. The submersible vehicle of claim 1, wherein the optical fiber is configured to be at least one of a distributed temperature sensor, a distributed acoustic sensor, a distributed pressure sensor, a chemical sensor, a camera, and an x-ray sensor.

6. The submersible vehicle of claim 1, wherein the housing is made from at least one of acetal resin, polyether ether ketone, aluminum, polyimide, and engineered thermoplastics.

7. The submersible vehicle of claim 1, further comprising sensors positioned in the housing, the sensors configured to measure parameters, wherein the measured parameters are transmitted through the optical fiber to the data acquisition system.

8. A system comprising:
a fluidic channel having a first end and a second end, the fluidic channel comprising a fluid;
a submersible vehicle disposed within the fluidic channel, the submersible vehicle comprising:
a housing;
a first bobbin coupled to the housing and configured to release, at a first release rate, an optical fiber communicatively coupled with a data acquisition system; and
a propulsion system coupled with the housing, the propulsion system configured to propel the submersible vehicle in the fluid at a velocity; and
a second bobbin positioned at the first end of the fluidic channel and configured to release the optical fiber at a second release rate, wherein the second release rate is different from the first release rate.

9. The system of claim 8, wherein the optical fiber is at rest relative to the fluid.

10. The system of claim 8, wherein the optical fiber is configured to transmit, in real-time, measured parameters of the fluidic channel to the data acquisition system.

11. The system of claim 10, wherein the measured parameters include at least one of temperature, acoustics, pressure, chemical composition, visuals, and x-ray.

12. The system of claim 10, wherein the optical fiber is configured to be at least one of a distributed temperature sensor, a distributed acoustic sensor, a distributed pressure sensor, a chemical sensor, a camera, and an x-ray sensor.

13. The system of claim 8, wherein the submersible vehicle further comprises sensors, the sensors configured to measure parameters of the fluidic channel, wherein the measured parameters are transmitted through the optical fiber to the data acquisition system.

14. The system of claim 13, wherein the submersible vehicle further comprises a memory storage, wherein the measured parameters are stored in the memory storage.

15. The system of claim 8, wherein the fluidic channel is one of a wellbore, a drill string, or a pipeline.

16. The system of claim 8, wherein first release rate is equal to or greater than the velocity of the submersible vehicle, and wherein the second release rate is equal to the velocity of the fluid such that the optical fiber is at rest relative to the fluid.

17. A method comprising:
providing a submersible vehicle and a fluidic channel having a first end and a second end, the submersible vehicle comprising:
a housing;
an optical fiber coupled with the housing and communicatively coupled with a data acquisition system; and
a propulsion system coupled with the housing, the propulsion system configured to propel the submersible vehicle;
wherein the data acquisition system is positioned proximate the first end of the fluidic channel;
deploying the submersible vehicle in a fluid in the fluidic channel through the first end of the fluidic channel;
propelling, by the propulsion system, the submersible vehicle from the first end toward the second end of the fluidic channel at a velocity;
releasing the optical fiber at the submersible vehicle at a first release rate equal to or greater than the velocity of the submersible vehicle;
releasing the optical fiber at the first end of the fluidic channel at a second release rate such that the optical fiber is at rest relative to the fluid, wherein the first release rate is different from the second release rate; and
transmitting, in real-time through the optical fiber, measured parameters of the fluidic channel to the data acquisition system.

18. A submersible vehicle comprising:
a housing;
an optical fiber coupled with the housing and communicatively coupled with a data acquisition system;
a propulsion system coupled with the housing, the propulsion system configured to propel the submersible vehicle in a fluid at a velocity, wherein the propulsion system includes at least one of propellers or a pump-jet system; and
a plurality of fins coupled to the housing and configured to control at least one of a direction, orientation, or stability of the submersible vehicle as it is propelled in the fluid, wherein at least one fin of the plurality of fins is adjustable by a motor in communication with a processor that provides instructions to the motor to move the at least one fin;
wherein the optical fiber is configured to be released at a release rate equal to or greater than the velocity of the submersible vehicle, and
wherein the submersible vehicle is buoyant so as to not sink or contact objects to be inspected.

* * * * *